United States Patent
Beyer

(12) 
(10) Patent No.: US 6,517,063 B2
(45) Date of Patent: Feb. 11, 2003

(54) HOLDER FOR AN OIL FILTER

(76) Inventor: Donald J. Beyer, 71 Lakeshore Dr., Sterling, MA (US) 01564

( * ) Notice: Subject to any disclaimer, the term of this patent is extended or adjusted under 35 U.S.C. 154(b) by 0 days.

(21) Appl. No.: 09/902,203

(22) Filed: Jul. 10, 2001

(65) Prior Publication Data

US 2002/0174529 A1 Nov. 28, 2002

Related U.S. Application Data

(60) Provisional application No. 60/293,111, filed on May 23, 2001.

(51) Int. Cl.$^7$ .................................................. B25B 1/00
(52) U.S. Cl. ..................... 269/156; 269/296; 269/287
(58) Field of Search ...................... 81/3.4, 120, 121.1, 81/180.1; 269/287, 246, 156

(56) References Cited

U.S. PATENT DOCUMENTS

| | | | |
|---|---|---|---|
| 3,048,067 A | * 8/1962 | Miles et al. | 81/3.4 |
| 4,979,355 A | * 12/1990 | Ulevich | 81/121.1 |
| 5,896,785 A | * 4/1999 | Shaw et al. | 81/121.1 |
| 5,924,342 A | * 7/1999 | Chou | 81/120 |
| 6,101,904 A | * 8/2000 | Freitas | 81/121.1 |
| 6,205,888 B1 | * 3/2001 | Laudani | 269/254 R |

* cited by examiner

Primary Examiner—Robert C. Watson
(74) Attorney, Agent, or Firm—Ted Masters

(57) ABSTRACT

A holder for an oil filter includes a container having an open top and a base having an upper surface. An upwardly opening socket is disposed upon the upper surface. The socket is shaped and dimensioned to receive the head portion of the oil filter. Once the oil filter is inserted into the holder, retaining means hold the oil filter firmly in place. The holder and oil filter may then be placed in a vice, and the filter cut open in accordance with established procedures.

3 Claims, 10 Drawing Sheets

Fig_8

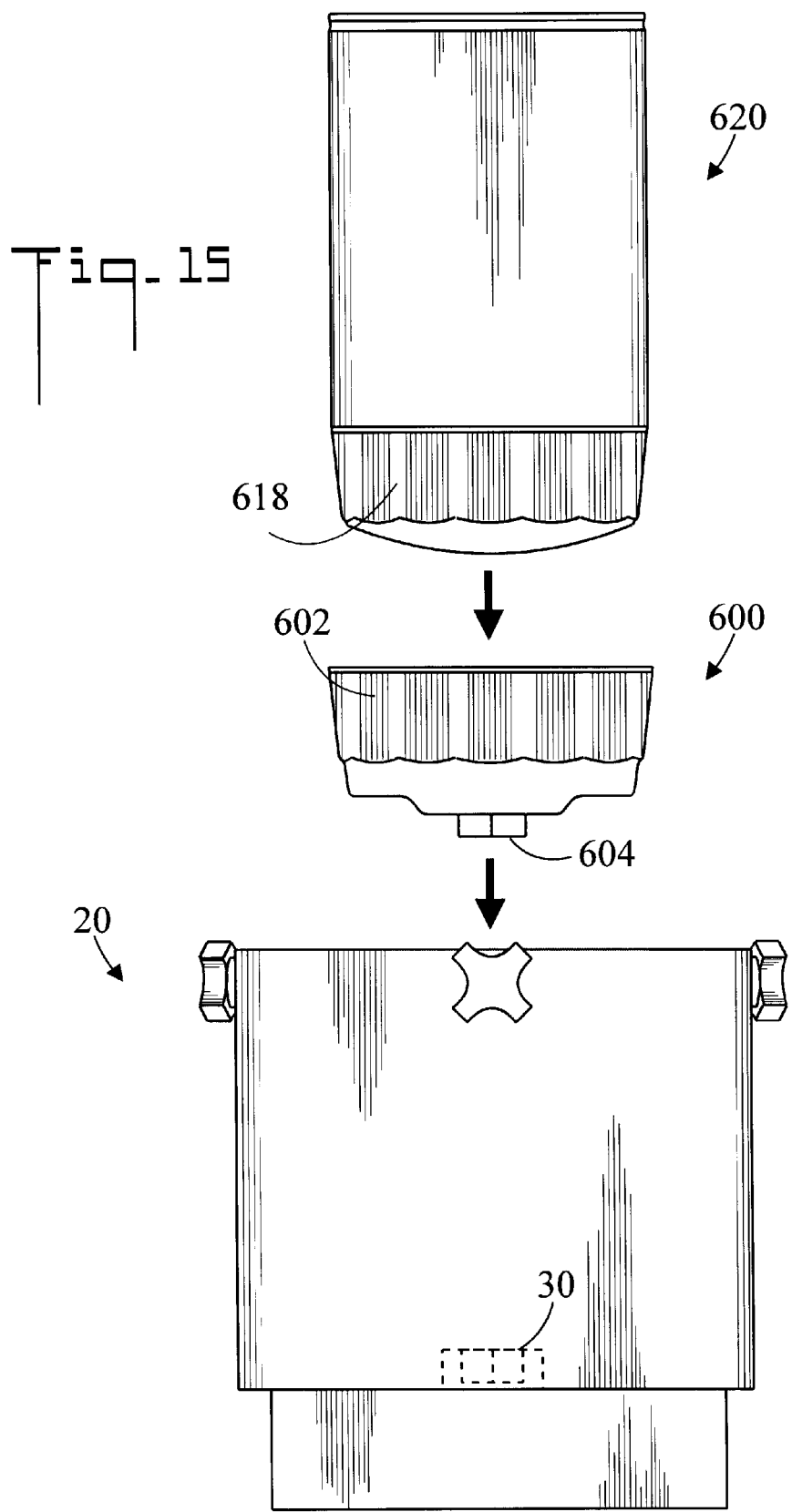

HOLDER FOR AN OIL FILTER

CROSS REFERENCE TO RELATED APPLICATION

This application claims the filing benefit under 35 U.S.C. 119(e) of U.S. Provisonal Application No. 60/293,111, filed May 23, 2001, which is included herein by refererence.

TECHNICAL FIELD

The present invention is generally directed to oil filters, and more particularly to a holder for an oil filter which allows the filter to be easily and cleanly cut open for inspection purposes.

BACKGROUND OF THE INVENTION

During a 100 hour or annual inspection on a piston aircraft, one of the accepted practices in the industry is that the oil is changed and the spin on oil filter is replaced. In addition, the old filter is cut open and the filter media is inspected for any metal particles which would indicate a potential internal failure of main bearings or other moving parts internal to the engine crankcase.

The most popular brand of aviation oil filter is the Champion brand. It has a 1-inch hex nut spot welded on the dome of the filter in order to be able to be removed. The only way to hold the filter is to place it in a vice and grab it by this 1 inch nut and use a variety of oil filter cutters on the market to cut it open. The problem is the filter wants to move left and right regardless how tight the vice is. In fact, since this nut is stamped sheet metal and spot welded to the dome of the filter, it has its limitations as to how tight the vice can be. When the filter media core is removed from the canister, some oil usually runs outside and down the side of the filter canister and onto your vice and the floor.

SUMMARY OF THE INVENTION

The present invention is directed to a holder for an oil filter which overcomes the previously described shortcomings. The holder comprises a container into which the oil filter may be inserted. The holder firmly holds the filter, and then the holder and filter are installed in a vice. The filter may then be cut open with a saw or other cutting device for the purpose of inspection. The holder firmly grasps the oil filter and prevents it from moving during the cutting operation. The holder further contains any residual oil which remains inside the filter, thereby preventing oil spillage. The present invention may be utilized with either aircraft oil filters, or automotive oil filters by using an oil filter wrench.

In accordance with a preferred embodiment of the invention, a holder for an oil filter having a shaped head includes a container having an open top and a base. An upwardly opening socket is centrally disposed above the base, the socket being shaped and dimensioned to receive the shaped head of the oil filter.

In accordance with an important aspect of the invention, the shaped head of the oil filter is hexagonal as is the upwardly opening socket of the holder.

In accordance with an important feature of the invention, the base has a lower surface having a downwardly projecting flange. The flange is used to clamp the holder in a vice.

In accordance with another important aspect of the invention, retaining means are provided for firmly gripping the oil filter when it is inserted into the holder. In a preferred embodiment, the retaining means include a plurality of screws which may be tightened to abut and hold the oil filter.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 15 is a reduced side elevation view of the automotive oil filter and wrench being inserted into the holder of the present invention.

DETAILED DESCRIPTION OF THE INVENTION

Figure 1:
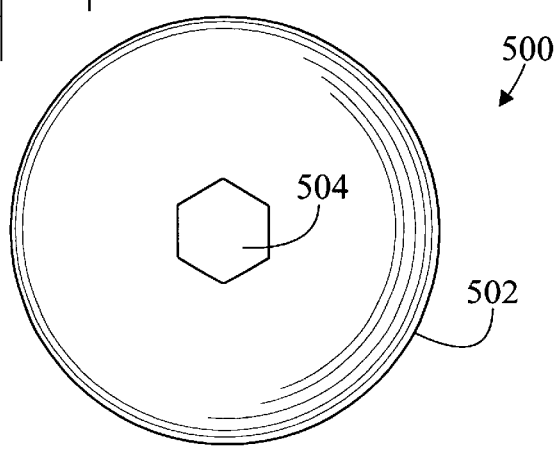
FIG. 1 is a top plan view of a prior art aircraft oil filter.
Figure 2:
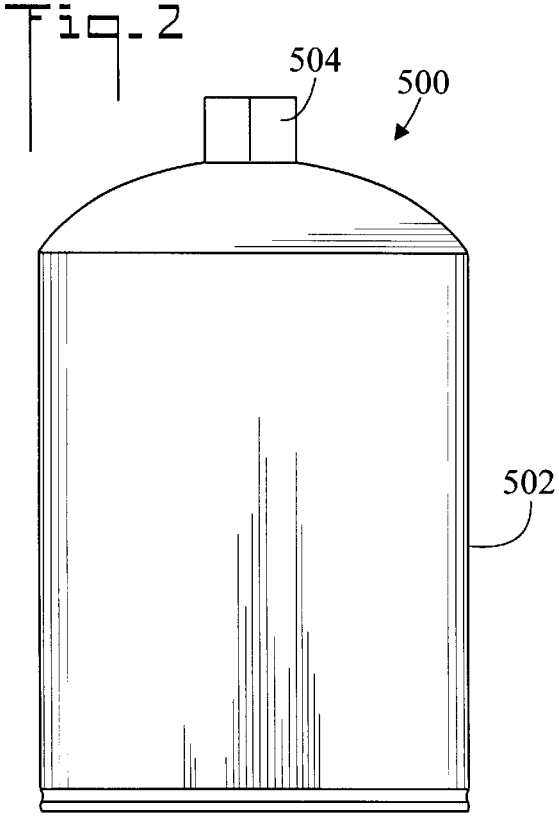
FIG. 2 is a side elevation view of the oil filter.
Figure 3:
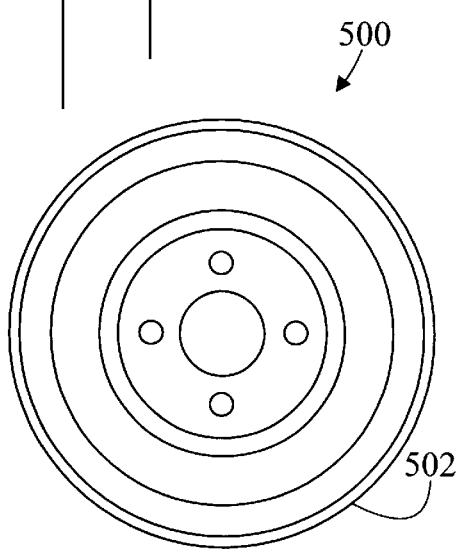
FIG. 3 is a bottom plan view of the oil filter.

Referring initially to FIGS. 1–3, there are illustrated top plan, side elevation, and bottom plan views respectively of a prior art oil filter for an aircraft engine, generally designated as 500. Oil filter 500 includes a cylindrical body 502 and a hexagonal-shaped head portion 504.

Figure 4:
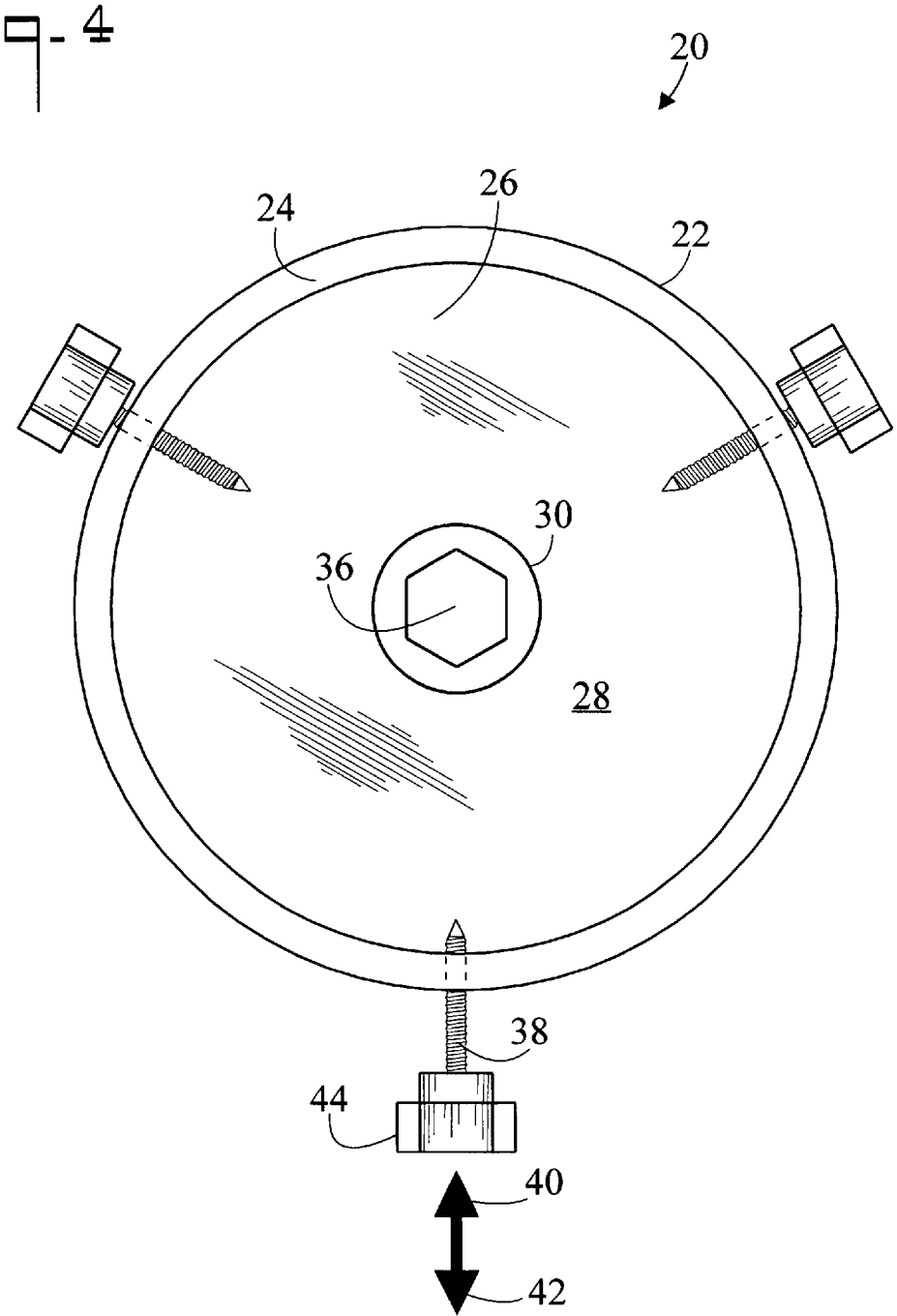
FIG. 4 is a top plan view of a holder for an oil filter in accordance with the present invention.
Figure 5:
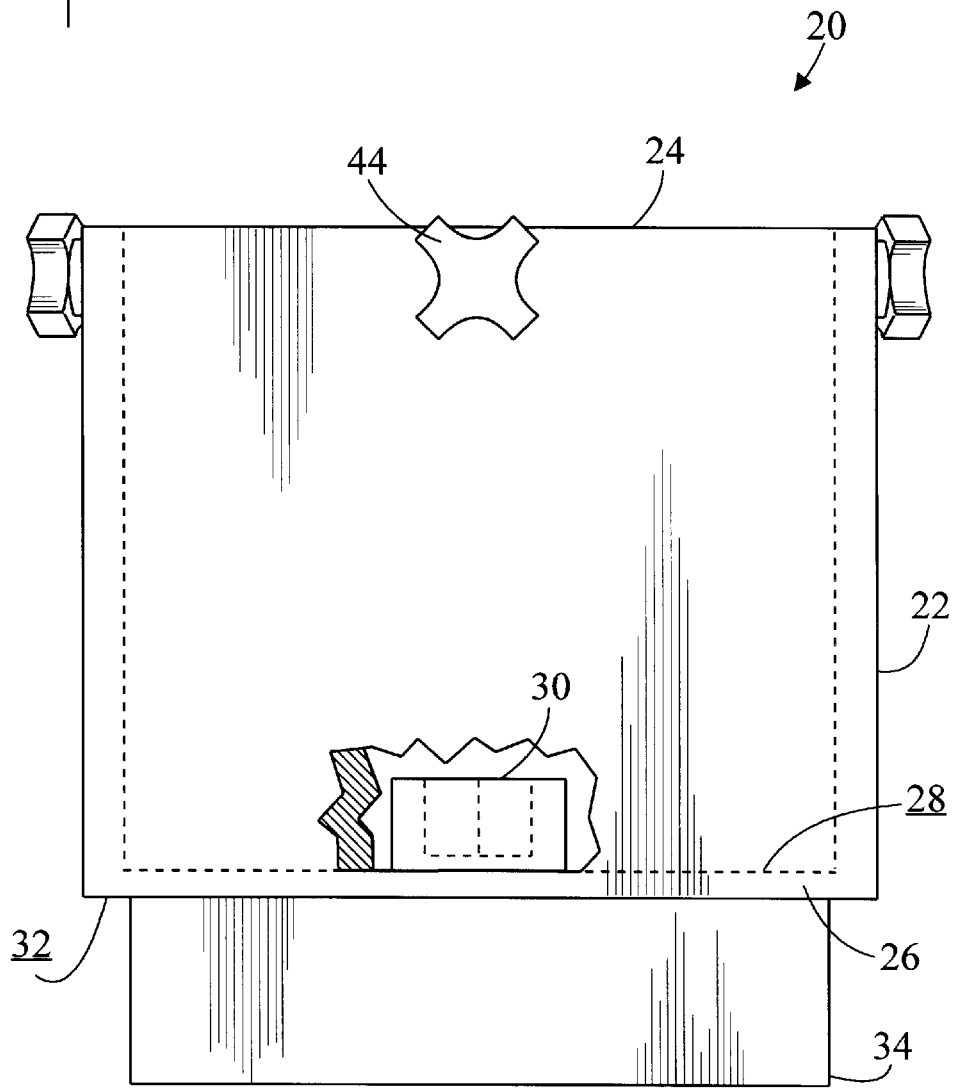
FIG. 5 is a front elevation view of the holder with a cutaway view of a socket.
Figure 6:
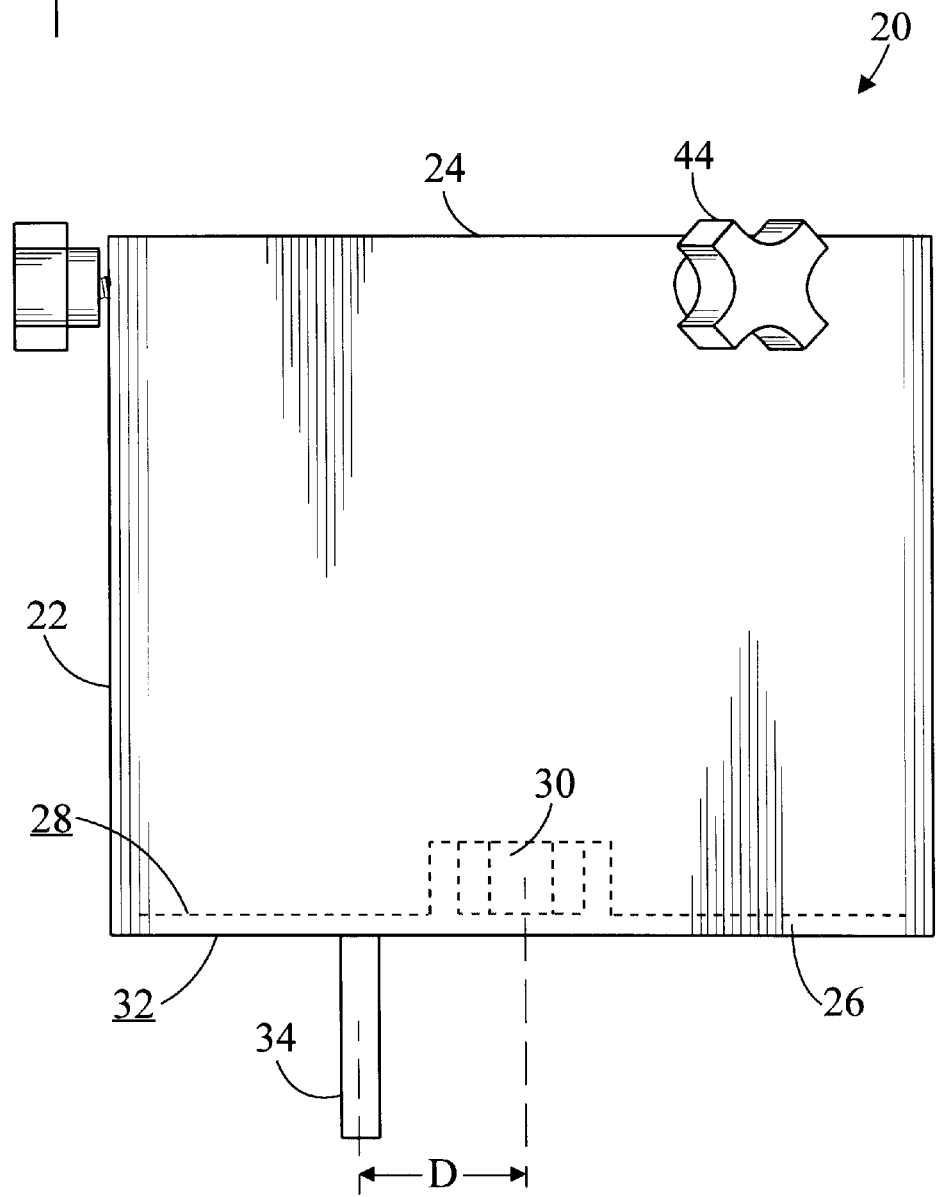
FIG. 6 is a side elevation view of the holder.

Now referring to FIGS. 4–6, there are illustrated top plan, front elevation, and side elevation views respectively of a holder for an oil filter in accordance with the present invention, generally designated as 20. Holder 20 includes a container 22 having an open top 24 and a base 26 which has an upper surface 28. In the shown preferred embodiment, container 22 is cylindrical in shape. An upwardly opening socket 30 is centrally disposed upon upper surface 28. Socket 30 is hexagonal, and is shaped and dimensioned to receive and rotationally constrain hexagonal head 504 of oil filter 500. FIG. 5 shows a cutaway view of socket 30.

Base 26 has a lower surface 32 which has a downwardly projecting flange 34. Flange 34 is used to place holder 20 in a vice 506 (refer to FIG. 9). Flange 34 is offset a distance D from socket 30. This is so a short side of holder 30 may be placed in vice 506, and therefore not interfere with the turning of the vice handle 508 (also refer to FIG. 9).

Figure 8:
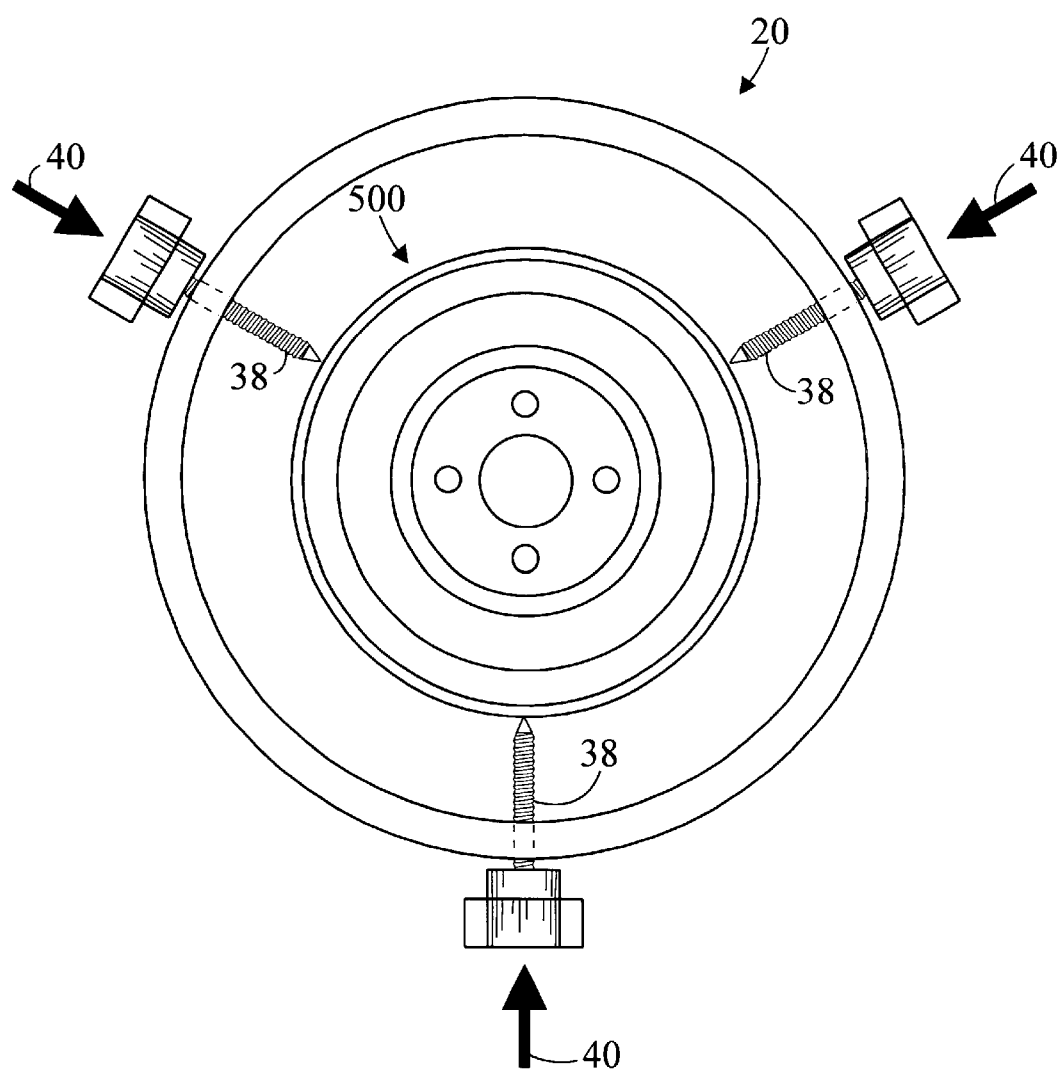
FIG. 8 is a top plan view of the holder with the oil filter inserted.

Holder 20 includes retaining means for firmly gripping oil filter 500 and holding it in place when it is inserted into the holder 20 (also refer to FIG. 8). In a preferred embodiment, the retaining means includes container 22 having a center 36. A plurality of screws 38 threadably engaging container 22. The screws 38 are selectively movable toward and away from center as in directions 40 and 42. So that when the oil filter 500 is inserted into holder 20, screws 38 may be tightened to abut the oil filter 500 and hold it firmly in place within container 22 (refer to FIG. 8). In the shown preferred embodiment, three screws 38 are disposed around oil filter 500. Also, screws 38 each have a knob 44 to effect the tightening and loosening process. It may be appreciated that other retaining means such as clamps, a close fitting aperture, and the like could alternatively be employed to firmly hold oil filter 500 in place within holder 20.

Figure 7:
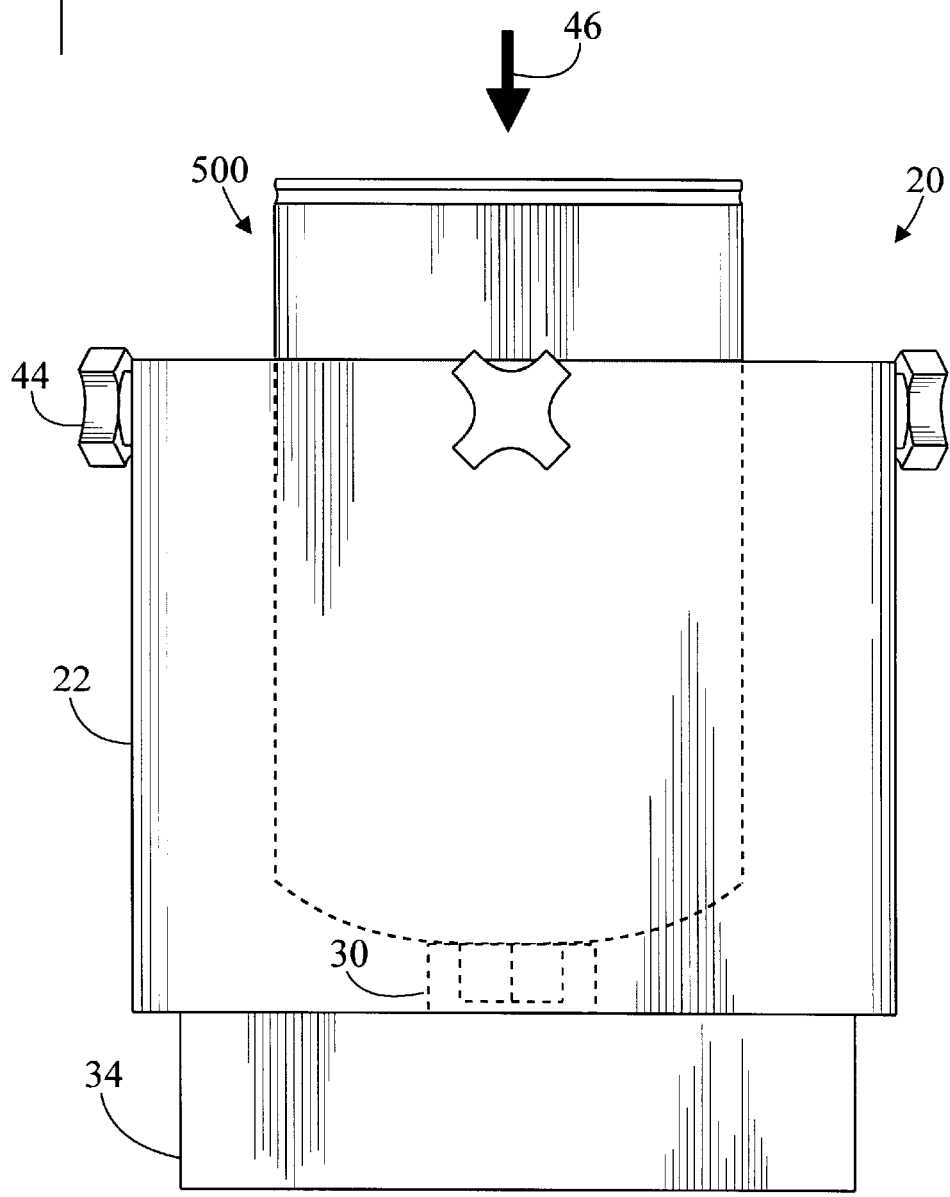
FIG. 7 is a front elevation view of the holder with the oil filter inserted.

FIGS. 7 and 8 are front elevation and top plan views respectively of holder 20 with oil filter 500 inserted. Oil filter 500 has been inserted, head portion 504 first, in direction 46 into holder 20 until head portion 504 is received by socket 30. Screws 38 have been tightened in direction 40 so that they abut and firmly hold oil filter 500.

Figure 9:
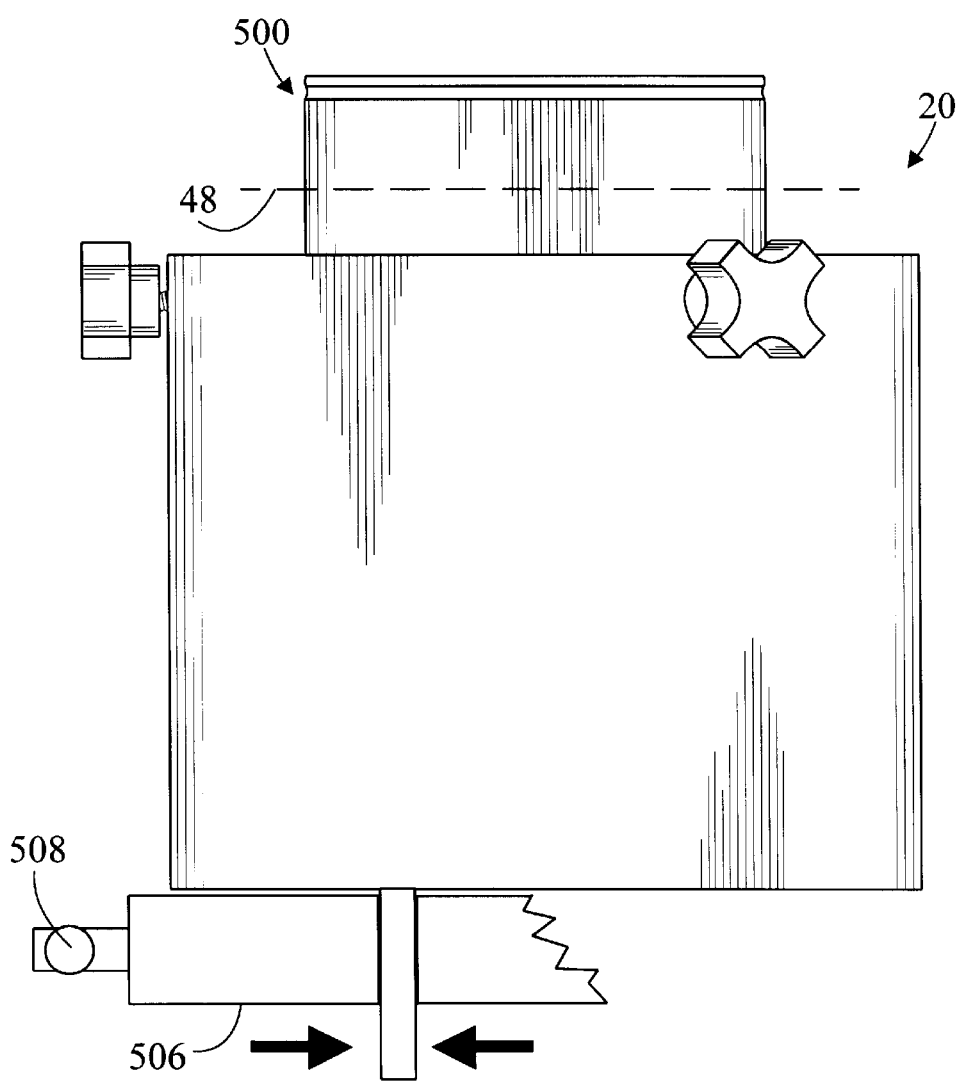
FIG. 9 is a side elevation view of the holder with oil filter installed in a vice.

FIG. 9 is a side elevation view of holder 20 with oil filter 500 installed in a vice 506. With oil filter 500 firmly inserted in holder 20, and holder 20 firmly held by vice 506, oil filter 500 may be cut open along line 48 using tools well known in the art.

Figure 10:
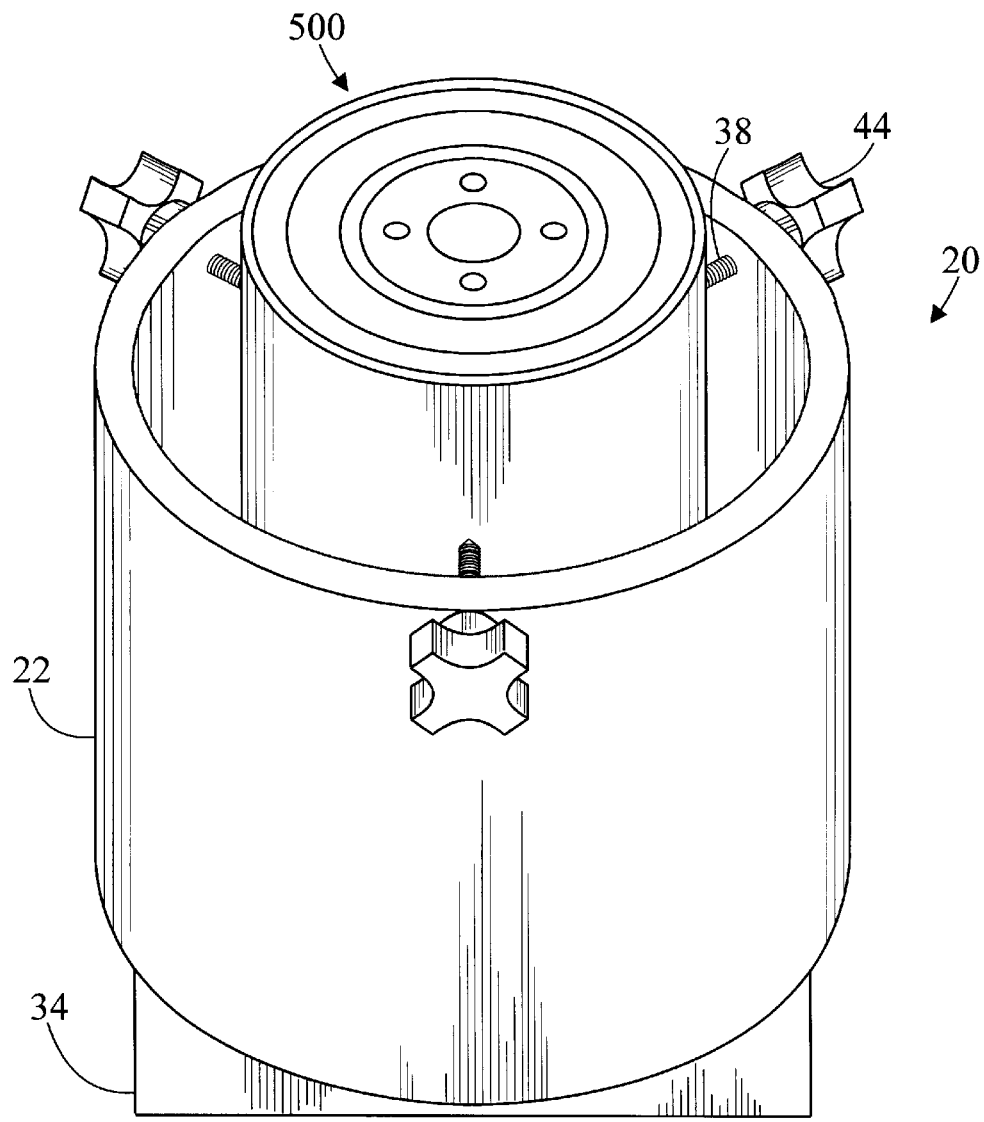
FIG. 10 is a perspective view of the holder with an oil filter inserted.

FIG. 10 is a perspective view of holder 20 with an oil filter 500 inserted.

Figure 11:
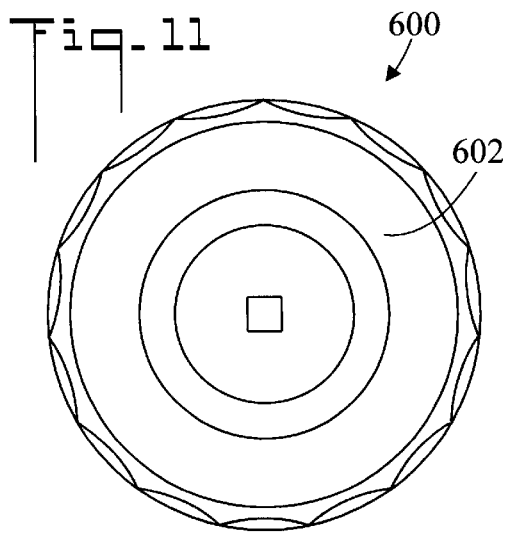
FIG. 11 is a top plan view of a prior art automotive oil filter wrench.
Figure 13:
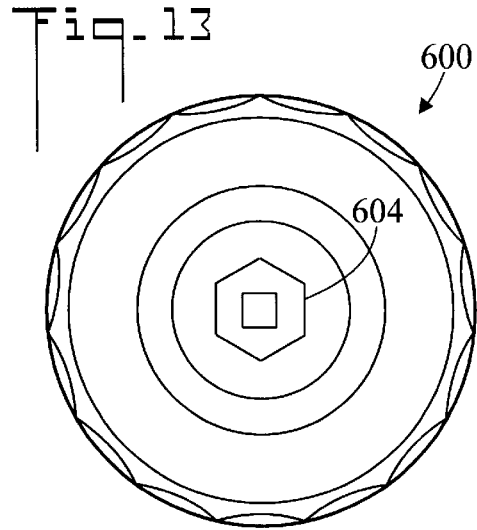
FIG. 13 is a bottom plan view of the wrench.
Figure 12:
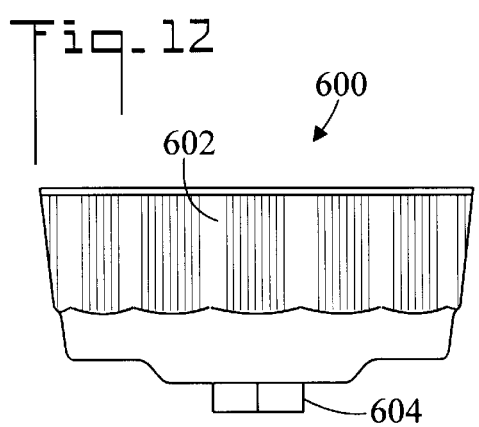
FIG. 12 is a side elevation view of the wrench.

Referring now to FIGS. 11–13, there are illustrated top plan, side elevation, and bottom plan views respectively of a prior art automotive oil filter wrench, generally designated as 600. Wrench 600 has (1) a first portion 602 which is shaped and dimensioned to receive the first shaped head 618 of an oil filter 620 (refer to FIG. 14). That is, wrench 600 is adapted to receive the scalloped head 618 of the automotive oil filter 620. Wrench 600 has an opposite second portion which has a second shaped head 604. In the shown conventional embodiment of wrench 600, second shaped head 604 is hexagonal. Socket 30 of holder 20 is shaped and dimensioned to receive the second shaped head 604 of wrench 600. In a preferred embodiment socket 30 is hexagonal to receive the hexagonal second shaped head 604 of wrench 600.

Figure 14:
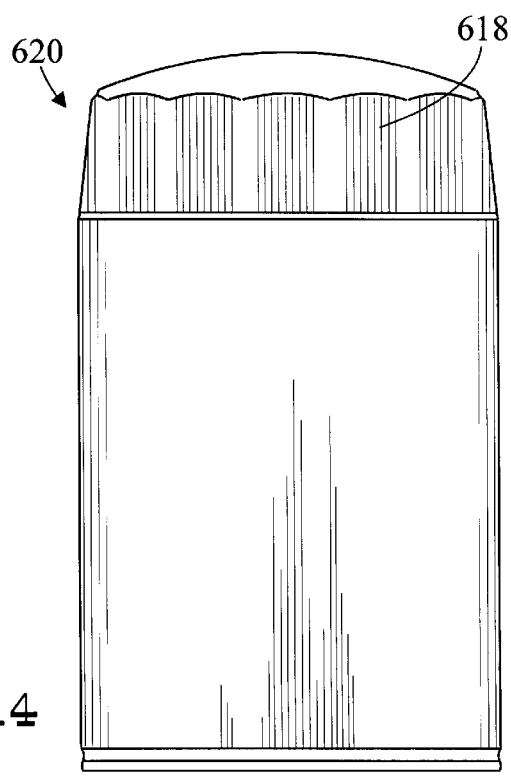
FIG. 14 is a side elevation view of a prior art automotive oil filter.

FIG. 14 is a side elevation view of a conventional prior art automotive oil filter 620 having a scalloped head 618.

FIG. 15 is a reduced side elevation view of the automotive oil filter 620 and wrench 600 being inserted into holder 20 of the present invention. Second shaped head 604 is received by socket 30, and oil filter 620 is received by first portion 602 of wrench 600.

A method of holding an oil filter, comprises the steps of:
providing the oil filter having a shaped head portion;
providing a vice;
providing a holder for the oil filter, the holder including (1) a container having an open top and a base having an upper surface, (2) an upwardly opening socket disposed upon the upper surface, the socket shaped and dimensioned to receive and rotationally constrain the shaped head of the oil filter, (3) said base having a lower surface having a downwardly projecting flange, and (4) retaining means for firmly gripping the oil filter when it is inserted into the holder;
tightly placing the flange in the vice;
placing the oil filter in the holder so that the shaped head is received by the socket; and,
activating the retaining means so that the oil filter is firmly held in place within the holder.

DESCRIPTION OF THE INVENTION

Purpose—The oil filter holder is intended to be placed in a vice and hold an oil filter to allow cutting open and retaining any oil when the filter media core is removed.

Parts—The oil filter holder consists of an aluminum plate approximately 6.5 inches square. A 6-inch long piece of 2 inch by 1.5 inch aluminum angle is screwed to the bottom of this plate. A 5.5-inch OD piece of aluminum with a 0.250 wall thickness is screwed to the plate. Three equally spaced pointed thumbscrews travel in 0.250×20 threaded holes to bear on the filter. In the center of the pipe is a 1 inch hex approximately 0.400" deep. This is screwed to the plate to accept the hex of the filter.

Features

The present invention is unique in that it provides a stable platform to hold a filter for cutting.

The holder for an oil filter helps keep the vice, floor and shop area clean during the cutting and inspection process.

The present invention is flexible in that some commercially available automotive filter wrenches i.e., K-D, Inc., of Hunt Valley, Md. #2991, that have a 1 inch hex can be placed inside the holder and can now hold any 3.7 inch diameter automotive filter for cutting. This can appeal to the race car group.

Advantages

Practically any brand or design of oil filter cutter can be used with my invention to cut the filter open.

The present invention makes a tough job a little easier and promotes cutting a filter open.

The present invention reduces the hazard and danger of a filter slipping out of the vice.

After cutting the filter open and removing the filter media core, any oil that does spill out into the cup of the holder is captured and available for analysis. Although this particular sample of oil may be somewhat contaminated, no oil or metal particles are lost.

The present invention is precision machined of 6061-T6 aluminum. All attaching hardware is hardened.

The holder is also designed to accept optional accessories

Testing Results

After cutting several filters open using the holder, the fatigue associated with this procedure has be substantially reduced. The cutting operation overall is less tedious to perform. It is safer and certainly is a lot cleaner.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A holder for an oil filter, comprising:
a container having an open top and a base;
said base having an upper surface;
an upwardly opening socket disposed upon said upper surface;
retaining means for firmly gripping the oil filter when it is inserted into said holder;
said retaining means further including:
said container having a center;
a plurality of screws threadably engaging said container, said screws selectively movable toward and away from said center; and,
so that when the oil filter is inserted into said holder, said screws may be tightened to abut the oil filter and hold it firmly in place within said container.

2. A holder for an oil filter having a hexagonal head, said holder comprising:

a container having an open top and a base;

said base having an upper surface;

an upwardly opening socket disposed upon said upper surface;

said socket being hexagonal and centrally disposed upon said base;

said container being cylindrical and having a center;

a plurality of screws threadably engaging said container, said screws selectively movable toward and away from said center, so that when the oil filter is inserted into said holder, said screws may be tightened to abut the oil filter and hold it firmly in place within said container; and, said base having a lower surface having a downwardly projecting flange.

3. A holder for an oil filter, the oil filter having a shaped head, said holder comprising:

a container having an open top and a base;

an upwardly opening socket centrally disposed above said base, said socket shaped and dimensioned to receive the shaped head of the oil filter;

said base having a lower surface having a downwardly projecting flange; and, retaining means for firmly gripping the oil filter when it is inserted into said holder.

* * * * *